July 26, 1932.  R. F. HALL  1,869,253
AIRPLANE
Filed Aug. 21, 1931

Inventor
Randolph F. Hall
By
Attorney

Patented July 26, 1932

1,869,253

UNITED STATES PATENT OFFICE

RANDOLPH F. HALL, OF ROCHESTER, NEW YORK

AIRPLANE

Application filed August 21, 1931. Serial No. 558,593.

This invention relates to certain improvements in airplanes; and the nature and objects of the invention will be readily apparent to and understood by those skilled in the aeronautical art in the light of the following explanation and detailed description of the accompanying drawing illustrating what I at present believe to be the preferred embodiments or aerodynamical and mechanical expressions of my invention from among various other forms, arrangements, combinations and constructions of which the invention is capable within the spirit and the scope thereof.

This application is a disclosure of subject matter contained in my U. S. patent application filed October 12, 1928, Serial No. 312,087, for certain improvements in airplanes, now Patent No. 1,818,332 granted on Aug. 11, 1931.

More specifically the invention has to do with and is directed to airplane wings, or supporting or lift surfaces of those general types in which variable lift is obtainable through the employment of a pivotally mounted lower or under surface, or so-called wing flap, capable of depression or downward swinging to positions such that through the establishment of pressure differences an increased lift is developed by and from a wing or supporting surface; and a general characteristic of the instant invention resides in the provision of such a pivoted surface or wing flap with a balanced portion, which preferably forms a unitary structure therewith, and through the medium of which more efficient operation and control of such surface or flap is made possible, and a tendency of the surface or flap toward automatic functioning or operation to vary the wing lift in accordance with changes in the angle of attack of the wing, obtains.

In certain types of airplane wings, supporting, or lift surfaces, air displacement openings, slots, or passages are provided by which the lift of the wing or surface is varied, through the control of air displacement therethrough, either by means of vanes, flaps or the like, or by the angle of attack of the wing, or by both such means; and a further characteristic and feature of the invention resides in the provision with such general types of wings or surfaces, of the pivoted surface or wing flap having the balance portion, in which the balance portion forms and provides the means or medium for controlling air displacement through a wing opening, slot, or passage, in accordance with the position of the pivoted surface or flap; such features and characteristics having the attendant objects of obtaining more efficient operation and control of the wing and the pivoted surface or wing flap thereof, and of developing the tendency of the balance portion to cause automatic functioning and operation of the surface or flap.

Another feature of the invention is the structural and mechanical simplicity obtained in a wing having the foregoing characteristics, by which practical manufacture is made possible, and a design and structure produced having the required factor of safety with minimum weight and efficient aerodynamically in operation, while retaining ease of operation and control for the pivoted surface or wing flap through simple yet efficient mounting thereof in the wing structure.

With the foregoing general characteristics and objects, as well as certain other objects and results in view, which will be at once apparent from the following explanation, the invention consists in certain novel features in design, and in combinations and construction of elements thereof, as will be more fully and particularly referred to and specified hereinafter.

Referring to the accompanying drawing.

Figure 1:
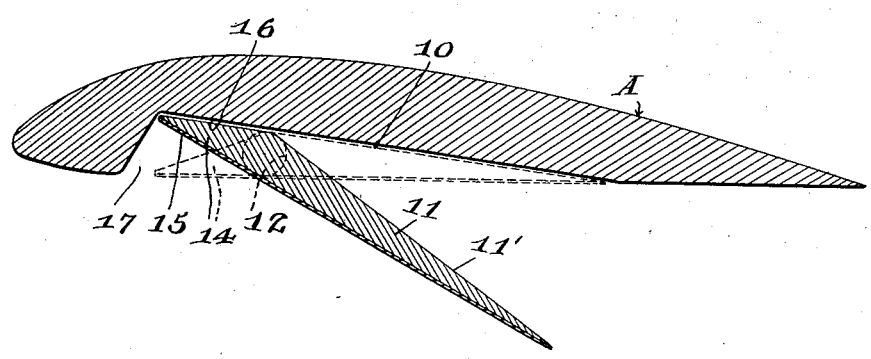
Fig. 1 is a transverse, vertical section, more or less diagrammatical, through a wing having a balanced flap mounted thereon and embodied therein, in accordance with the invention.

One embodiment and adaption illustrative of a balanced wing flap of my invention is disclosed by way of an example in Fig. 1 of the accompanying drawing, as applied to and incorporated in a wing A of the more or less conventional type, that is, of the type not provided with lift increasing air displacement openings, passages, or slots therein.

In the given example, the wing A is formed with an under side or lower recess 10 therein, intermediate the leading and trailing edges thereof, in this instance, which recess is of gradually decreasing depth rearwardly of the wing. Within the recess 10, a camber varying surface or wing flap 11 is pivotally mounted for vertical swinging on a horizontal axis 12 disposed longitudinally or spanwise of the wing within wing recess 10, adjacent but spaced a distance rearwardly from the forward end of the recess. The surface or flap 11 extends rearwardly from the axis 12 and in its normal upwardly swung and fully raised position forms a portion of and substantially completes and carries out the normal under surface of the wing contour, as will be clear by reference to the dotted line position of the flap 11 shown in Fig. 1.

The wing flap 11 is extended a distance forwardly from axis 12 in continuation of and forming a rigid, unitary structure with the flap, to form and provide a balance portion or member 14, the lower surface 15 of which is substantially a straight continuation of the lower surface of flap 11, but the upper surface 16 of which is tapered or inclined downwardly and forwardly, as will be clear from Fig. 1. The forward or leading edge of the balance portion 14 is spaced rearwardly from the forward side of wing recess 10, with the wing flap and balance portion in the normal dotted line position shown in Fig. 1, to provide the space or gap 17 into the space formed by recess 10 above the inclined upper surface 16 of the balance portion 14. For economy of weight and structure, the upper or inner side 11' of the flap 11, is not provided with a skin or covering, and similarly, if desired, the under side of the wing recess to above flap 11 to the rear of axis member 12 is not provided with a skin or covering. However, it is to be understood that the invention is not necessarily restricted to such construction and arrangement, for if desired, a skin or covering can of course be applied over such portions of the wing and flap structure.

In operation, the wing A of Fig. 1, is in its high speed, low angle of attack condition with the wing flap 11 swung upwardly to normal position within the wing recess and the balance portion 14 thereof swung downwardly, the entire balanced flap unit 11—14 being disposed within the wing recess with the under side or surface of the unit providing and forming a portion of the normal wing under surface contour. In order to increase the wing lift, the flap 11 is swung downwardly to the full line position of Fig. 1, and thus flap movement is balanced and rendered easier and smoother in operation by the balance portion of the flap 11. In the lowered position of the flap 11, the inclined upper surface 16 of the balance portion 14, permits free upward swinging of such portion without interference from the wing structure, such surface 16 in effect defining and limiting the lowered angle or downward swinging of the flap unit to the desired camber and lift increasing position.

Further, by the balance portion 14, with gap 17 between its forward edge and the wing structure, a tendency toward automatic functioning of the flap is obtained in accordance with wing angle of attack and varying airflow conditions established and acting upon the flap 11 and its unitary balance portion 14.

Figure 2:
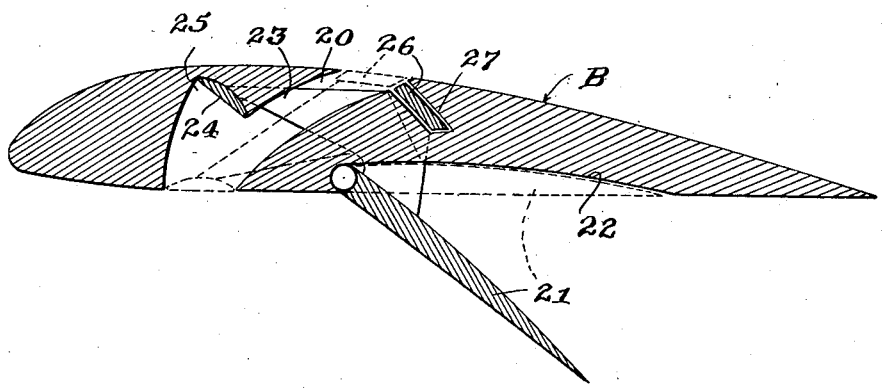
Fig. 2 is a transverse, vertical section, more or less diagrammatical, through a design of wing having an air displacement slot therethrough, with a form of balanced wing flap of the invention in which the balance portions of the flap control the slot and with which the flap is mounted remote from the slot.

A balanced wing flap unit of the general type of Fig. 1 recessed in the under surface of a wing, is shown in Fig. 2, as applied to a wing B of the type having an air displacement slot 20 therethrough forward of the wing flap. The wing flap 21 is remote from and performs no direct function with slot 20, but is normally disposed in an under recess 22 formed in wing B, as shown by dotted lines in Fig. 2, for the low angle of attack, high speed condition of the wing, while in lowered, high lift and wing under surface camber increasing position, is swung downwardly from recess 22, to the full line position of Fig. 2.

Balance means is provided for the wing flap 21, as a unit therewith, and is arranged to open and close the air displacement passage or slot 20, as the flap is lowered or raised to and from normal position. This is accomplished in the present example, by the provision of the forwardly extended cantilever support arms 23 fixed to the flap 21 and swingable therewith, suitable spaces being of course provided in and through the wing structure to permit movement of the arms, and the balance member or vane 24 secured to and fixed across the forward ends of these arms. The arrangement and relative mounting of arms 23 and balance member 24 is such that, with the flap 16 in normal raised position within wing recess 22, the arms 23 with member 24 are swung downwardly to position the balance member 24 in and closing the lower inlet end of slot 20 through the wing under surface, as shown by dotted lines in Fig. 2. The slot 20 is formed with a forward enlargement provided by the recess 25 extending upwardly of and within the wing to receive the balance member or vane 24 when it is swung upwardly to position removed from and opening the wing slot 20, by and with the flap 21 swung to lowered, wing lift increasing position, as clearly shown by the full line positions of these elements in Fig. 2.

If desired, an additional member or vane 26 can be provided on and as a part of the balanced flap unit 21—24, for opening and closing the upper discharge end of slot 20 through the upper surface of wing B. Suitable upward extensions of the support arms 23 are provided, across the upper ends of which the member or vane 26 is secured so as to be positioned across and closing the upper end of wing slot 20 with the flap 21 swung upwardly and balance member 24 in lower passage end closing position, such position of member 26 being shown by dotted lines in Fig. 2.

Upon swinging flap 21 to lowered position and balance member 24 to slot opening position, the upper member or vane 26 of the unit is swung rearwardly and downwardly, so that a suitable recess 27 is formed in the wing structure to receive vane 26 in its position swung or moved rearwardly from slot closing position, and removed from the upper end of and opening slot 20, all as clearly shown in full lines by Fig. 2.

In operation, the members or vanes 24 and 26 of the balanced flap unit, are moved to position opening the wing slot 20 with flap 16 swung downwardly for the camber increasing high lift condition of the wing, and are moved to position closing the inlet and discharge ends of the slot with flap 21 swung upwardly into wing recess 22, for the high speed, low attack angle condition of the wing B. The balance member or vane 24 functions as a balance for the flap 21 and by the forces acting thereon, tends toward an automatic functioning of the flap unit, while at the same time the slot 20 is open and closed, or flow of air therethrough is controlled, in accordance with the position of the camber and lift increasing flap 21.

The invention as typified by the examples of possible embodiments thereof disclosed in Figs. 1 and 2 and explained above, obtains a balance for, and ease and smoothness in operation and control of, lifting increasing flaps of airplane wings or supporting surfaces of those types in which no slot or air passage is provided, or in which the flap is remote from a slot or passage, through the provision of a unitary structure forming a balanced flap unit. The flap unit is structurally simple and readily lends itself to mounting and incorporation in a wing without material structural complications.

It is also evident that various changes, modifications, substitutions, and variations might be resorted to without departing from the spirit and scope of my invention, and hence I do not wish to limit myself to the exact and specific disclosures hereof.

What I claim, is:

1. An airplane wing formed with a recess in the under side thereof, a wing flap pivotally mounted for vertical swinging to and from position within said recess forming a portion of the wing under surface, said flap provided with a forwardly extending balance portion disposed within the recess with its leading edge spaced rearwardly from the forward end of the recess to form an air space therebetween.

2. An airplane wing formed with a recess in the under side thereof, a wing flap pivotally mounted for vertical swinging to and from position within said recess forming a portion of the wing under surface, said flap provided with a forwardly extending balance surface disposed within the recess with its leading edge spaced rearwardly from the forward end of the recess to form an air space therebetween, and the upper surface of said balance portion inclined downwardly and forwardly to the leading edge thereof to provide clearance for upward swinging of the balance portion in the recess when the flap is swung downwardly.

3. An airplane wing formed with a recess in the under side thereof, a wing flap pivotally mounted for vertical swinging to and from position within the recess forming a portion of the wing under surface, said flap provided with a forwardly extending balance portion disposed within the recess, and the upper side of the balance portion inclined forwardly and downwardly to provide clearance for upward swinging of the balance portion through the recess when the flap is swung downwardly to camber increasing position.

4. The combination with an airplane wing formed with an air displacement passage therethrough having an inlet in the under side and an outlet in the upper side of the wing, of a pivotally mounted wing flap at the under side of the wing, and balance members carried by and movable with said flap, said members closing the inlet and the outlet for said passage with the flap in normal raised position and opening the inlet and outlet with the flap in lowered position.

5. An airplane wing formed with an air displacement passage substantially vertically disposed therethrough with its inlet at the under side and its outlet at the upper side thereof, a wing flap pivotally mounted disposed at the under side of the wing to the rear of the passage inlet and in normal raised position forming a portion of the wing under surface, a balance member for the wing flap spaced forwardly therefrom and supported thereby for movement therewith as a unit, said balance member disposed in said passage closing the inlet thereof with the wing flap in raised position and swung to position opening said inlet with the wing flap in lowered position.

6. The combination with an airplane wing formed with an air displacement passage therethrough having an outlet in the upper side of the wing, of a vertically swingable wing flap mounted at the under side of the wing, and a member carried by and movable with said wing flap to close said passage outlet with the flap in normal raised position and to open said outlet with the flap in lowered position.

7. The combination with an airplane wing provided with an air displacement passage therethrough having an inlet through the under side and an outlet through the upper side of the wing, of a vertically swingable wing flap mounted at the under side of the wing remote from said passage, and members carried by and movable with said flap to close said passage inlet and outlet with the flap in normal raised position and to open the passage inlet and outlet with the flap in lowered position, respectively.

Signed at Rochester, Monroe County, New York, this 14th day of Aug., 1931.

RANDOLPH F. HALL.